United States Patent
Bharadwaj (10) Patent No.: US 10,986,023 B2
(45) Date of Patent: Apr. 20, 2021

(54) USING MACHINE LEARNING TO DETECT SLOW DRAIN CONDITIONS IN A STORAGE AREA NETWORK

(71) Applicant: Cisco Technology, Inc., San Jose, CA (US)

(72) Inventor: Harsha Bharadwaj, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 96 days.

(21) Appl. No.: 16/516,410

(22) Filed: Jul. 19, 2019

(65) Prior Publication Data

US 2021/0021526 A1    Jan. 21, 2021

(51) Int. Cl.
| | | |
|---|---|---|
| *H04L 12/28* | (2006.01) | |
| *H04L 12/801* | (2013.01) | |
| *G06N 20/00* | (2019.01) | |
| *H04L 29/08* | (2006.01) | |
| *G06K 9/62* | (2006.01) | |
| *H04L 12/931* | (2013.01) | |

(52) U.S. Cl.
CPC .......... *H04L 47/127* (2013.01); *G06K 9/6256* (2013.01); *G06N 20/00* (2019.01); *H04L 47/39* (2013.01); *H04L 49/357* (2013.01); *H04L 67/1097* (2013.01)

(58) Field of Classification Search
CPC ...... G06N 20/00; G06K 9/6256; H04L 47/39; H04L 49/357
See application file for complete search history.

(56) References Cited

U.S. PATENT DOCUMENTS

| | | |
|---|---|---|
| 10,394,469 B2 | 8/2019 | Bharadwaj et al. |
| 2005/0108444 A1 | 5/2005 | Flauaus et al. |
| 2009/0116381 A1 | 5/2009 | Kanda |
| 2012/0063304 A1* | 3/2012 | Gnanasekaran ........ H04L 49/15 370/230 |
| 2012/0063333 A1* | 3/2012 | Gnanasekaran ...... H04L 43/062 370/252 |
| 2016/0239185 A1* | 8/2016 | Balimidi ............... G06F 3/0482 |
| 2016/0275288 A1* | 9/2016 | Sethumadhavan .......................... H04L 63/0428 |
| 2017/0187627 A1 | 6/2017 | Bharadwaj et al. |
| 2017/0214605 A1* | 7/2017 | Astigarraga ........... H04L 45/22 |
| 2018/0069775 A1 | 3/2018 | Bharadwaj |
| 2018/0198722 A1* | 7/2018 | Kollu .................. H04L 47/2483 |
| 2018/0255079 A1* | 9/2018 | Paine ..................... H04L 63/20 |

(Continued)

OTHER PUBLICATIONS

Lee et al., "A grammar-based semantic similarity algorithm for natural language sentences", The Scientific World Journal, vol. 2014, Article ID 437162, 17 pages.

(Continued)

*Primary Examiner* — Elisabeth Benoit Magloire
(74) *Attorney, Agent, or Firm* — Behmke Innovation Group LLC; Kenneth J. Heywood; Jonathon P. Western (57) ABSTRACT

In one embodiment, a device obtains one or more fabric port (F-port) counters and one or more extender port (E-port) counters in a storage area network (SAN). The device inputs the obtained F-port and E-port counters to a machine learning-based prediction model. The device uses the prediction model to predict a slow drain condition in the SAN, based on the counters input to the model. The device initiates a corrective measure in the SAN, based on the predicted slow drain condition.

20 Claims, 5 Drawing Sheets

(56) References Cited

U.S. PATENT DOCUMENTS

2019/0294575 A1* 9/2019 Dennison .............. G06F 9/3877
2020/0134423 A1* 4/2020 Shinde ................ G06F 11/0787

OTHER PUBLICATIONS

Boutaba et al., "A comprehensive survey on machine learning for networking: evolution, applications and research opportunities", Springer Nature, Journal of Internet Services and Applications (2018), https://doi.org/10.1186/s13174-018-0087-2, 99 pages.

"Buffer credits", online: https://en.wikipedia.org/w/index.php?title=Buffer_credits&oldid=583931414, dated Nov. 30, 2013, printed Jun. 25, 2019, 1 page, Wikimedia Foundation, Inc.

"Storage area network", online: https://en.wikipedia.org/wiki/Storage_area_network, dated Jun. 14, 2019, printed Jun. 25, 2019, 5 pages, Wikimedia Foundation, Inc.

"What is a Storage Area Network?" Storage Networking Industry Association, Training & Education Sources, 2019, https://www.snia.org/education/storage_networking_primer/san/what_san, printed Jun. 24, 2019, 3 pages.

Mazurek, et al., "Fibre Channel Performance: Congestion, Slow Drain, and Over Utilization, Oh My!", https://fibrechannel.org/wp-content/uploads/2018/02/FCIA_Fibre_Channel_Performance_Congestion_Slowdrain_and_Over_Utilization_Final.pdf, Live Webcast, 30 pages, Feb. 6, 2018., Fibre Channel Industry Association.

\* cited by examiner

USING MACHINE LEARNING TO DETECT SLOW DRAIN CONDITIONS IN A STORAGE AREA NETWORK

TECHNICAL FIELD

The present disclosure relates generally to computer networks, and, more particularly, to using machine learning to detect slow drain conditions in a storage area network (SAN).

BACKGROUND

A storage area network (SAN) is a specialized form of computer network that allow for host access to storage devices, with Fibre Channel (FC) being one of the most popular protocols used to interconnect hosts and storage devices in a SAN. One distinguishing characteristic of an FC-SAN is a no-drop mechanism, to avoid data loss when writing data to the storage devices. Unfortunately, this mechanism can also lead to a slow drain condition, whereby one or a very small number of end devices can impinge on the performance of the entire SAN. Notably, devices in a SAN typically employ a buffer-to-buffer credit system in which a given port decrements its credits when it sends a frame and increments its credits when it receives back a ready indication, in response. If the available credits for the port reaches zero, it can no longer transmit frames. While this credit mechanism can be beneficial, in many cases, situations such as a speed mismatch between end devices or an end device not releasing credits back to the switch's port can also cause the SAN to take increasingly longer to convey frames, as a backup begins to build in the SAN, which is also referred to as a slow drain condition.

Detecting the existence of a slow drain condition in a SAN remains fairly challenging. Even more challenging is discerning the root cause of a slow drain condition, such as the ports actually responsible for causing the slow drain condition. With the recent evolution of machine learning, however, it now becomes possible to not only detect the root cause of a slow drain condition in a SAN, but to also initiate corrective measures for the condition, automatically.

DESCRIPTION OF EXAMPLE EMBODIMENTS

Overview

According to one or more embodiments of the disclosure, a device obtains one or more fabric port (F-port) counters and one or more extender port (E-port) counters in a storage area network (SAN). The device inputs the obtained F-port and E-port counters to a machine learning-based prediction model. The device uses the prediction model to predict a slow drain condition in the SAN, based on the counters input to the model. The device initiates a corrective measure in the SAN, based on the predicted slow drain condition.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
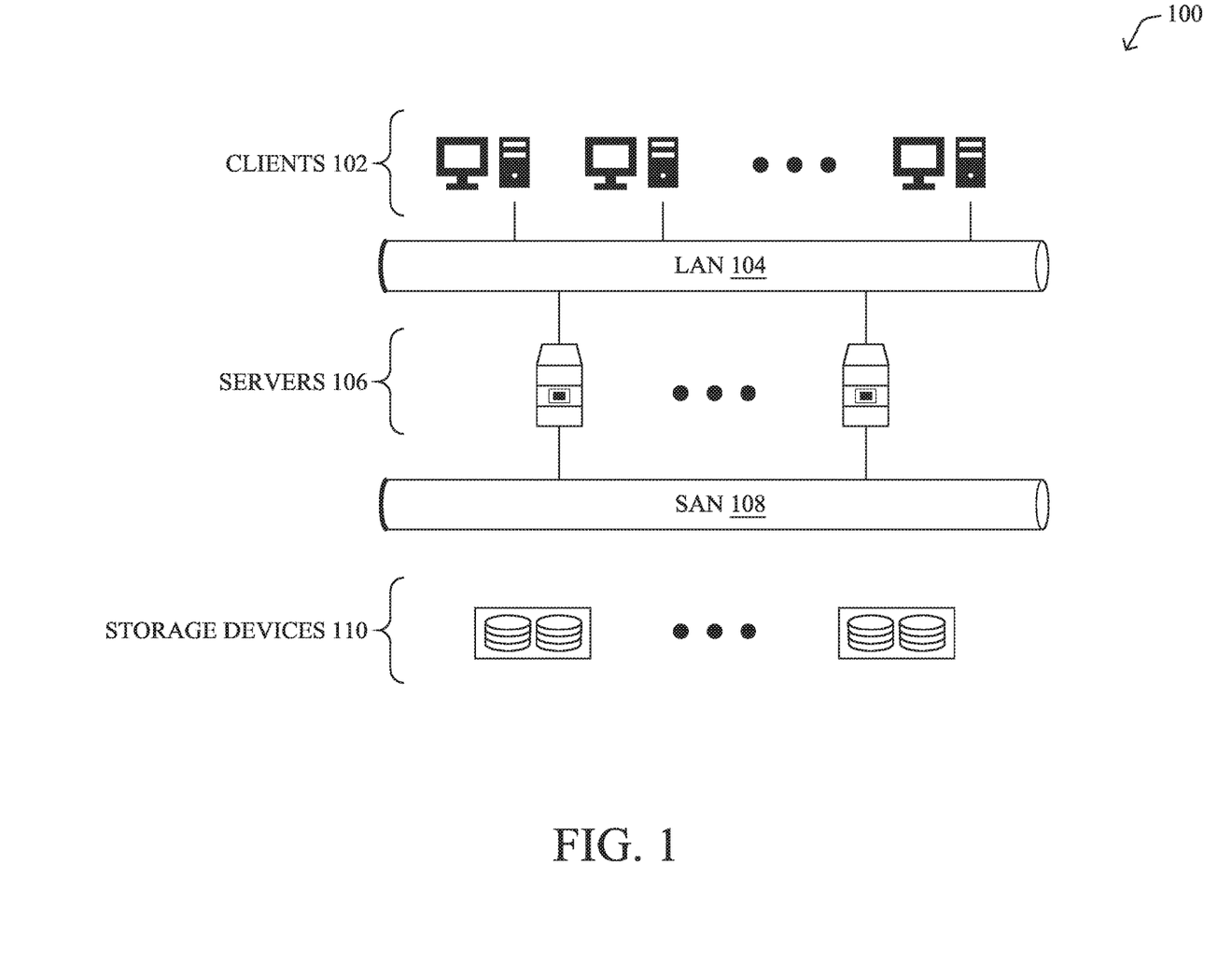
FIG. 1 illustrates an example computer network.

FIG. 1 is a schematic block diagram of an example computer network 100 illustratively comprising any number of clients 102 that are interconnected by a LAN 104. In general, clients 102 may comprise any number of computing devices such as, but not limited to, personal computers, mobile devices (e.g., cellular phones, tablets, etc.), wearable devices, sensors, actuators, or the like. Also connected to LAN 104 may be any number of servers 106 that provide various applications to clients 102 via LAN 104. For example, a client 102 may communicate with a server 106 via LAN 104 to execute a document management system (DMS) application, a messaging application, a videoconferencing application, a customer relationship management (CRM) application, etc.

As shown, network 100 may also include a storage area network (SAN) 108 that connects servers 106 with any number of storage devices 110. For example, storage devices 110 may include disk arrays, tape libraries, or the like. As would be appreciated, a SAN, such as SAN 108, is a specialized form of network that allows for block-level data storage in storage devices 110 in a manner that allows storage devices 110 to effectively act as local storage for the operating systems of servers 106. Typically, a SAN forms a switched fabric between servers 106 and storage devices 110.

Figure 2:
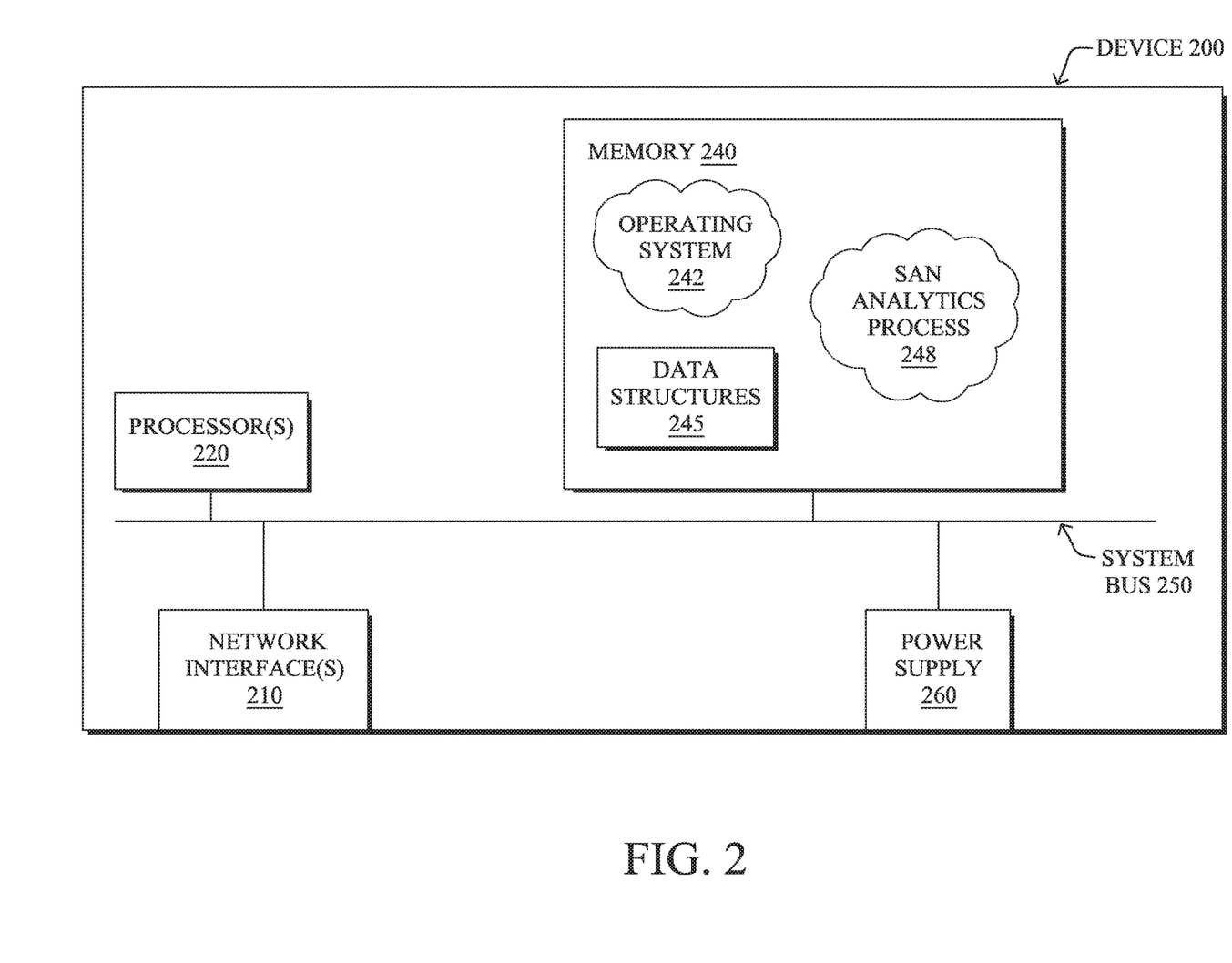
FIG. 2 illustrates an example network node/device.

FIG. 2 is a schematic block diagram of an example node/device 200 that may be used with one or more embodiments described herein, e.g., as any of clients 102, servers 106, or storage devices 110 shown in FIG. 1, a device in communication therewith, or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and is data structures associated with the embodiments described herein. The processor 220 may comprise necessary elements or logic adapted to execute the software programs and manipulate the data structures 245. An operating system 242 (e.g., the Nexus Operating System, or NX-OS, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a SAN analytics process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

SAN analytics process 248, detailed further below, includes computer executable instructions that, when executed by processor(s) 220, cause device 200 to analyze and assess the operations of a SAN, such as SAN 108 described previously. To do so, in some embodiments, SAN analytics process 248 may utilize machine learning, in various embodiments.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SAN analytics process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a particular condition in the SAN. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior, such as relationships between different measurements from the SAN. Semi-supervised learning models take a middle ground approach that uses a greatly reduced set of labeled training data.

Example machine learning techniques that SAN analytics process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a particular condition exists in the SAN. Conversely, the false negatives of the model may refer to the number of times the model failed to predict the presence of a particular condition, when that condition is actually present in the SAN. True negatives and positives may refer to the number of times the model correctly predicted the absence or presence of the condition in the SAN, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, a key feature of a SAN is a no-drop mechanism. While this helps deliver the high reliability demanded by the upper layer storage protocols, it is also highly prone to slow drain conditions whereby one or a few end devices can be detrimental to the performance of the entire SAN.

Figure 3:
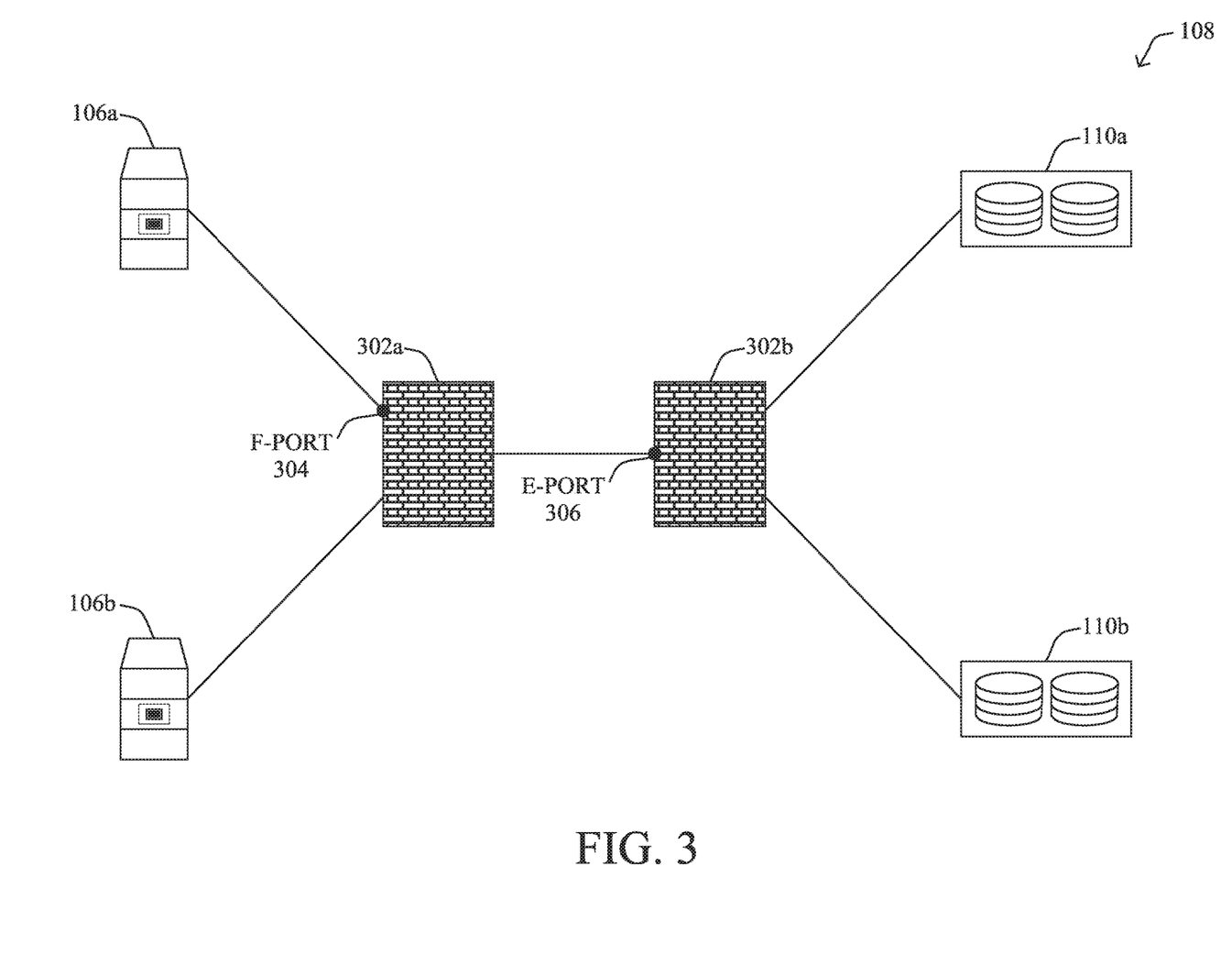
FIG. 3 illustrates an example storage area network (SAN)

FIG. 3 illustrates an example of SAN 108 in greater detail, according to various embodiments. At the core of SAN 108 may be any number of interconnected switches, such as switches 302a and 302b. For example, switches 302a-302b may be Cisco MDS 9000 series switches, or any other type of switch suitable for SAN operations. Example technologies that switches 302a-302b may support within SAN 108 may include, but are not limited to, Fibre Channel over Ethernet (FCoE), Fibre Channel (FC), Fibre Connection (FICON), Fibre Channel over IP (FCIP), Internet Small Computer System Interface (iSCSI), combinations thereof, or the like. Each switch 302 may also include one or more fabric ports (F-ports) that are used to connect with nodes, such as a server 106, and one or more extender ports (E-ports) used to cascade switches 302 together.

Typically, switches in a SAN, such as switches 302 shown, use buffer-to-buffer (B2B) credits, to act as a flow control mechanism and to represent how many frames a given port can store. When a port transmits a frame, its B2B credit count may be decremented by one and incremented only when a receiver ready (R_RDY) is received back. If the credit count of a given port reaches zero, the port cannot transmit again until receiving an R_RDY.

For purposes of illustration of slow drain conditions that can occur in a SAN, assume that switches 302a-302b connect servers 106a and 106b with storage devices 110a and 110b and that server 106a connected to switch 302a is a 'slow' device. Generally speaking, there are two broad categories of slow drain conditions in a SAN:

1. Classical Slow Drain—Here, the slow server 106a is not releasing credits back to the F-port 304 of switch 302a. This condition always begins on the edge port, such as F-port 304, and may gradually spread towards the core ports, such as E-port 306. Accordingly, this form of slow drain can be subdivided as follows:
   a. Level 1 (Mild)—In the mildest form of a classical slow drain condition, the F-port buffers of the switch can absorb the slowness of the end device, thereby preventing other flows from being impacted. For example, in a mild case, the buffer of F-port 304 of switch 302a can absorb the slowness of server 106a.
   b. Level 2 (Moderate)—Under this condition, the F-port buffers can no longer absorb the slowness of the end device, but the corresponding E-port buffers can. For example, the buffer of E-port 306 of switch 302b may be able to absorb the slowness of server 106a, in case the F-port buffer of switch 302a is exhausted and unable to absorb the slowness. However, under a Level 2 condition, other flows will experience some latency, as a result.
   c. Level 3 (Sever)—Here, both the F-port and E-port buffers are unable absorb the slowness of the end device, due to buffer exhaustion and leading to other flows in SAN 108 being significantly impacted.
2. Slow Drain Due to Oversubscription—A majority of the slow drain conditions in SANs are seen due to speed mismatch between communicating end-devices. It is fairly common today for an initiator port running at lower speeds (like 4G/8G) talking to a Target Port of higher speed (16G). The initiator side storage stacks may not be designed to consume responses at the high rates to which a modern All Flash Array may be capable of responding. This port rate limiting (to 4G/8G) that would kick in at the initiator F-port immediately causes back pressure on the E-ports ports, where credit exhaustion can happen. The F-port could be using only a few credits and all credit related counters will look normal, with only the data transmission rate on the port (tx_datarate) showing high rates. However, it would start showing slow drain conditions on the E-ports and start having a fabric-wide impact. For example, F-port 304 may exhibit a transmit data rate of 100%, while using only a few of its credits, which may be considered to be a normal condition on port 304.

A device that is not impacting any other part of the network does not technically qualify as a slow draining device and does not warrant any action on it per-se. However, a classical slow drain device today will typically be addressed by taking a remedial action based on the counter values for its corresponding F-port, without fully assessing its impact. A device generating an I/O request pattern that causes a momentary slowness (i.e., B2B credit exhaustion), but recovering soon after without impacting the E-port would still be classified as slow and recovery action initiated.

A slow drain device due to oversubscription results in an F-port seeing a close to 100% transmission data rate. But, a line rate traffic on a network port is a normal occurrence, even without an oversubscription-based slow drain condition being present. So, taking action on a device just because it runs at line rate will not be acceptable. Currently, there are no known detection methods able to detect such conditions by looking simply at the F-port counters.

Using Machine Learning to Detect Slow Drain Conditions in a SAN

The techniques herein allow for the detection of slow drain conditions, including oversubscription-based slow drain conditions, by leveraging machine learning. In some aspects, a machine learning model can be trained to try and establish the relationships between F-port and E-port counts, as traffic flows between them. Additional global factors contributing to the slow drain conditions can also be factor into the analysis. This allows for the detection and correction of a slow drain condition in a SAN more accurately and comprehensively, to reduce the impact of the condition on the fabric.

Specifically, according to one or more embodiments herein, a device obtains one or more fabric port (F-port) counters and one or more extender port (E-port) counters in a storage area network (SAN). The device inputs the obtained F-port and E-port counters to a machine learning-based prediction model. The device uses the prediction model to predict a slow drain condition in the SAN, based on the counters input to the model. The device initiates a corrective measure in the SAN, based on the predicted slow drain condition.

Illustratively, the techniques described herein may be performed by hardware, software, and/or firmware, such as in accordance with the SAN analytics process 248, which may include computer executable instructions executed by the processor 220 (or independent processor of interfaces 210) to perform functions relating to the techniques described herein.

Operationally, each switch in a SAN may maintain a number of port-level counters for their F-ports and/or E-ports. For example, in FIG. 3, each of switches 302a-302b may maintain any or all of the following counters for each of its ports:

1. tx_BBZ: This counter is incremented once there is a frame to send on the port, but there are no credits available.
2. tx_Wait: This counter is incremented every time a defined time period elapses with respect to a tx_BBZ condition. For example, this counter is typically incremented once for every 2.5 μs of a tx_BBZ condition.
3. tx_bbcredit: This counter represents the instantaneous transmission credits is available on the port. As described above, when this drops to 0, tx_BBZ increments once and the switch cannot transmit on the port until the switch receives an R_RDY and tx_bbcredit is incremented to a non-zero value.
4. tx_Drop: This counter is incremented when a frame is dropped due to a continuous tx_wait condition of a predefined amount of time. For example, switches today will typically drop a frame after 500 ms of waiting. The goal would be to prevent a tx_Drop condition in a no-drop fabric.
5. tx_datarate: This counter may track the rate of traffic on the port with respect to the speed of the port.

According to various embodiments, the techniques herein propose the use of a machine learning-based prediction model to detect slow drain conditions in a SAN based on the available port counters, such as those listed above. This can be performed either directly on a designated switch (e.g., a switch 302 executing SAN analytics process 248) or another device 200 executing SAN analytics process 248 that is in communication therewith. Notably, SAN analytics process 248 may obtain all of the per-port counters at a predefined cadence, which may be configurable. Indeed, the next generation application specific integrated circuits (ASICs) used by SAN switches to maintain the port counters are expected to support this functionality with minimal software intervention. Such port counter information can be used to form time series of port counters for input to a statistical classifier. This allows SAN analytics process 248 to build and train a model that models the relationship between a tx_BBZ condition on an E-port to a set of F-port slow drain conditions; that is, which F-ports contribute the most to a zero credit situation on an E-port, from a statistical standpoint.

During the learning phase, SAN analytics process 248 may obtain any or all of the F-port and E-port counters from the SAN switches 302 under scrutiny and populate an internal database with this information. Over time, this allows SAN analytics process 248 to accumulate a history of counter values that can be used to train the prediction model to learn the patterns present in the data. In turn, SAN analytics process 248 can use at least a portion of the port counter data to test the model for accuracy and, if need be, initiate retraining of the model. Once this testing phase has completed successfully, the model is ready to predict when a slow drain condition is present in the SAN and, more importantly, which F-ports are responsible for the condition. For example, the model may identify which F-ports are responsible for an E-port in the SAN exhibiting a slow drain condition.

Since multiple F-ports may be contributing to a slow drain condition on a given E-port, SAN analytics process 248 may train its prediction model using multiple linear regression with variable selection. This allows SAN analytics process 248 to assess the impact of all of the F-ports together on a given E-port. Such a multiple linear regression model takes the form:

$$Y = \beta_0 + \beta_1 X_1 + \beta_2 X_2 + \ldots + \beta_p X_p + \in$$

More specifically, SAN analytics process 248 may select a model by estimating which of the collective predictor F-port counters (e.g., tx_BBZ, tx_Wait, tx_datarate) are statistically more significant for a given E-port counter (e.g., tx_BBZ, tx_bbcredit). For this specific example, SAN analytics process 248 may use the following parameters:

$Y = A$ given $E\text{-}port$ in the fabric $X1 = A\ F\text{-}port\ (F1)\ \text{tx\_BBZ}$ counter value $X2 = A\ F\text{-}port\ (F1)\ \text{tx\_Wait}$ counter value $X3 = A\ F\text{-}port\ (F1)\ \text{tx\_datarate}$ counter value $X4 = A\ F\text{-}port\ (F2)\ \text{tx\_BBZ}$ counter value $X5 = A\ F\text{-}port\ (F2)\ \text{tx\_Wait}$ counter value

...

$Xp = A\ F\text{-}port\ (Fp)$ slow drain counter value

All of the other factors can also have some impact on the equation, such as the number of B2B buffers, the oversubscription ratio, the enabled switch data path features, and the like, in further embodiments, such as part of the error-coefficient $\in$. All the coefficients $\beta_0 \ldots \beta_p$ and the value of $\varepsilon$ will be estimated by the chosen model for a given E-port.

The F-port variables with the highest coefficients are the one that contributes the highest for an increasing E-port slow drain counter. The multiple linear regression approach also eliminates false positives where one predictor F-port variable could potentially "hijack" the impact of another by morphing itself as statistically more significant.

In machine learning parlance, a p-value establishes whether a substantial association between the predictor variables and the response can happen "by chance." SAN analytics process 248 can leverage statistical analysis to compute the p-value for each predictor. At the end of the training and model selection process, SAN analytics process 248 will have a list of F-port counters whose p-value is low and are, therefore, statistically most significant for a given fabric E-port slow drain symptoms.

In some cases, SAN analytics process 248 may also need to perform some additional experimentation before accepting the model for use. This may entail assessing any or all of the following:

1. Strength of Relationship: To establish whether there really is a relationship between all the F-ports and a given E-port, SAN analytics process 248 may evaluate the F-Statistic. As would be appreciated, the F-statistic is independent of the number of F-ports and more accurate than the p-values of the individual F-ports and establishes that all of the F-ports selected have a relationship to an E-port. The approach of using an F-statistic to test for any association between the predictors and the response works when p (number of F-ports) is relatively small compared to n (the number of training samples), which is generally true in this use case. SAN analytics process 248 may also deduce a p-value for an F-statistic, given the number of F-ports and the number of training data sets. Based on this p-value, SAN analytics process 248 can determine the validity of the hypothesis that a set of F-port slow drain counters have strong relationship to a given E-port slow drain counter.

2. Model Fit: An $R^2$ statistic is a measure of the linear relationship between a predictor and its response. An $R^2$ value close to 1 indicates that the model explains a large portion of the variance in the response variable. As multiple F-ports are being added, SAN analytics process 248 monitoring the $R^2$ value will tell whether the model fits the data or not. If adding a variable increases $R^2$ significantly, it is a better model versus a variable whose addition results in only a marginal increase in $R^2$ statistic.

3. Selecting Relevant Variables: Among a set of fabric F-ports, deciding the most important predictor F-ports can be achieved using a process known as variable selection. Accordingly, SAN analytics process 248 may use a mixed selection scheme that starts with no variables in the model and gradually adds F-port counters with the lowest individual p-value, one-by-one, that can provide the best fit with an overall low p-value. If the p-value rises above a threshold when one F-port counter is added, SAN analytics process 248 remove that variable.

Once a model is chosen using the above methods, SAN analytics process 248 can also compute a confidence interval by capturing additional data to be used as testing data on the model. Notably, by measuring how close the E-port counter value is predicted close to the F-port value, the confidence interval also establishes the error coefficient $\varepsilon$ inherent in the model.

Thus far, an assumption has been made that the relationship between the predictors and response here are both additive and linear. The additive assumption means that the effect of changes in a predictor F-port on an E-port is independent of the values of the other F-ports. The linear assumption means that the change in the E-port counters due to a one-unit change in an F-port counter value is constant, regardless of the value of the F-port counter. While common sense indicates that these assumptions are valid, SAN analytics process 248 can also perform additional testing of the model using more sophisticated techniques, to establish their statistical validity and before acceptance of the model. To do so, SAN analytics process 248 may employ any of the following:

1. An interaction technique to establish the presence of additive relationship, that is that the relationship is of the form: $Y=\beta_0+\beta_1 X_1+\beta_2 X_2$ and not of the form: $Y=\beta_0+\beta_1 X_1+\beta_2 X_2+\beta_3 X_1 X_2$ or the like.
2. Polynomial Regression that extends the linear model to accommodate nonlinear relationships by including polynomial functions of the predictors in the regression model that uses non-linear transformations of the predictors, such as log X, √X, and $X^2$, in the regression model—that is, there is indeed a relationship of the form: $Y=\beta_0+\beta_1 X_1$ and not $Y=\beta_0+\beta_1 X_1+\beta_2 X^2$. This regression will establish the presence of a linear relationship.

As would be appreciated, the regression process above, when repeated for all of the E-ports under scrutiny by SAN analytics process 248 in the SAN, results in a stack rank list of the top-slow-draining devices/F-ports that causes maximum collective impact in the fabric (every E-port). In turn, SAN analytics process 248 can use this information to initiate corrective measures such as port-quarantine (which is a congestion isolation feature of some SAN switches), port-flap, port reset, port ingress rate limiters, or the like. In addition, after a training, testing, and selecting a model, there is no need for the constant correlation of data, since the model can now list out the top F-ports impacting the fabric. This means some of the most time-consuming slow drain analysis can now be automated, thereby offloading a significant portion of tedious work from the administrator, while also potentially reducing resource consumption involved in constant correlation of counters in a data platform provided by device 200. Finally, the result can also be predicted with a certain confidence interval, affording the administrator additional control over which corrective measures should be taken, depending on the confidence associated with the prediction.

Using Machine Learning to Predict the Probability of Slow Drain Symptoms Occurring on an Initiator Port. The above techniques allow for the detection of slow drain conditions in a SAN. According to various embodiments, a further refinement of the techniques herein also allows for the determining the root cause of a slow drain condition down to the specific input/output (I/O) traffic patterns observed on the F-port. Indeed, even if the initiator is classified as slow draining, there is currently no visibility into the I/O traffic pattern from the initiator. Due to this lack of visibility, the only remedy currently available to mitigate the effects of a slow draining end device is to take action on the connecting switch F-port, like port fencing, port link reset, port quarantine, port rate-limit, etc., impacting the whole end device. However, a better corrective measure would be to apply application I/O tuning on the end device, without the need for a device level action.

In further embodiments, SAN analytics process 248 may also assess flow/initial trust list (ITL) level metrics per port, in addition to the counters of the port. This can be done on a per-flow basis (finest-granularity) or on an aggregate basis, up to the port level (coarse-granularity) using the concept of views. Indeed, SAN analytics process 248 may also obtain these ITL level metrics from a switch 302 at a predefined cadence. In turn, SAN analytics process 248 may use its statistical classification capabilities to build and train a model that can act as a slow drain symptom analyzer for assessing the initiator F-ports in the fabric.

Figure 4:
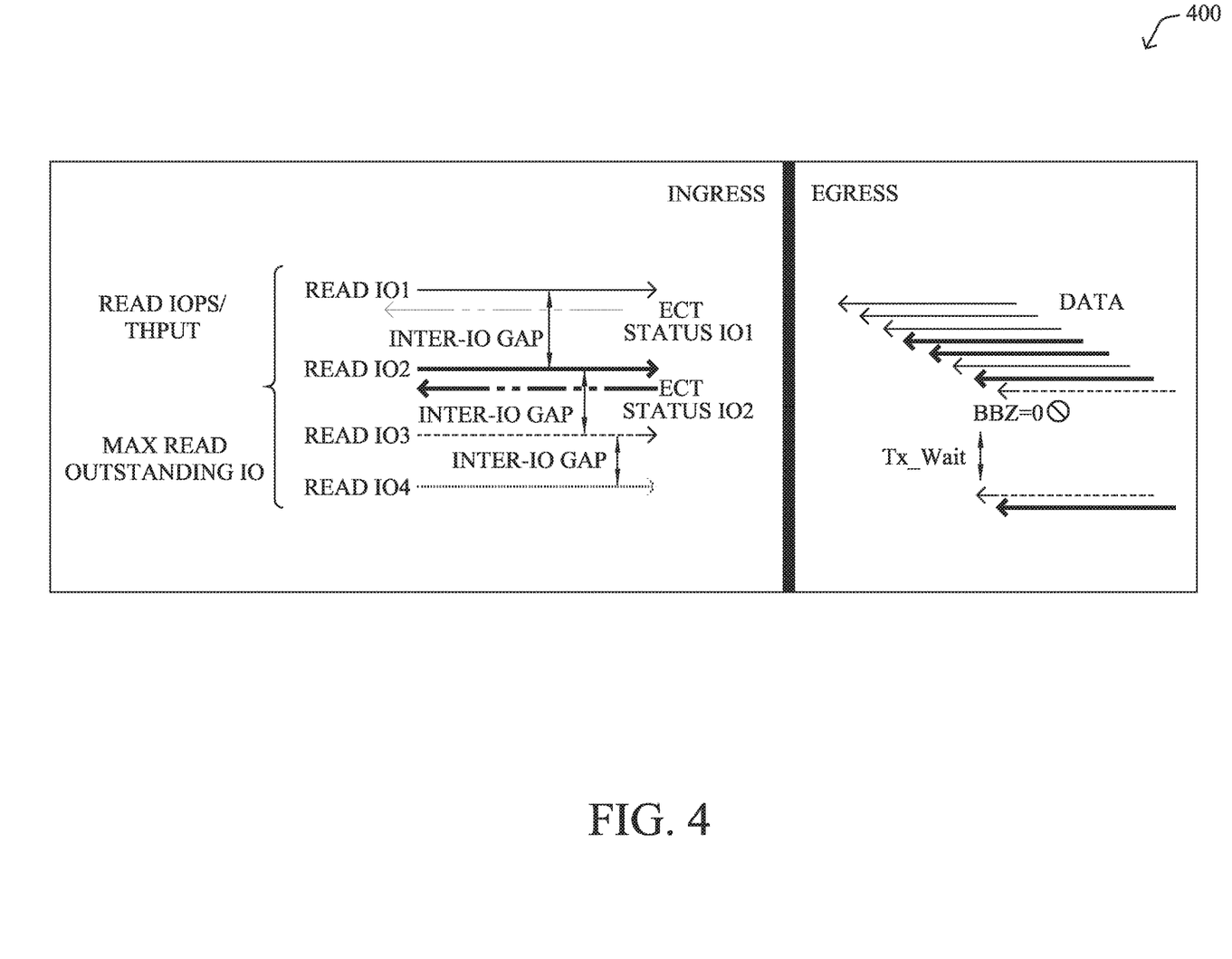
FIG. 4 illustrates an example diagram of flow characteristics.

One observation is that a majority of the storage traffic in a SAN tends to be transactional in nature and involves solicited Request and Response I/O requests (Read/Write). This leads to two types of datasets that SAN analytics process 248 can obtain from the switch 302 and assess:

1. On an F-Port connected to an initiator device (e.g., a server 106) the metrics that captures the incoming I/O pattern from an end-device per-ITL may include any or all of the following:
   Average IOPS: Average # of I/O operations per second
   Average Inter-IO-Gap: Average time interval between consecutive I/O requests
   Average Throughput: Average data transfer rate in terms of bytes/sec
   Average ECT: Exchange completion time aka latency per I/O
   Max Outstanding I/O: Max number of incomplete I/Os observed at any point in time
2. On an F-Port, the following counters:
   tx_BBZ
   tx_Wait FIG. 4 illustrates an example diagram 400 of flow characteristics for F-port Read I/O transactions, in some embodiments. As shown, these operations eventually lead to a slow drain condition whereby the tx_BBZ counter is equal to zero (e.g., a slow drain condition), resulting in delays.

In various embodiments, SAN analytics process 248 may use machine learning on the above two datasets to infer the relationship between the predictor variables (e.g., the I/O characteristics per-ITL seen on an initiator F-port) and a prediction (e.g., whether they will cause a slow drain condition on an F-port). To do so, during an initial learning phase, SAN analytics process 248 may populate its internal database with the above datasets obtained from any number of switches 302 in the SAN. Once a suitable amount of data has been obtained, SAN analytics process 248 may then proceed to train the model.

Due to the obvious linear relationship between the predictors and the prediction in this case, SAN analytics process 248 may leverage a parametric statistical learning method, in some embodiments. While SAN analytics process 248 can employ any number of different parametric statistical learning methods, SAN analytics process 248 may use multiple logistic regression, in a preferred embodiment. In general, multiple logistic regression takes into account multiple variables $X_1, \ldots, X_n$, to predict the probability of an event. As would be appreciated, multiple logistic regression is a classification problem that uses the formula:

$$p(X) = \frac{e^{\beta_0+\beta_1 X_1+\ldots+\beta_p X_p}}{1+e^{\beta_0+\beta_1 X_1+\ldots+\beta_p X_p}}$$

where p(X) is a number between 0-1, with 0 meaning zero probability and 1 meaning 100% probability, and e=Euler's number.

For this specific case, the variables above may be as follows:
p(X)=the probability of an initiator F-port P showing slow drain symptoms (tx_BBZ/txWait increasing)
$X_1$=Average IOPS on port P
$X_2$=Average Inter-IO-Gap on port P
$X_3$=Average Throughput on port P
$X_4$=Average Latency on port P
$X_5$=Max Outstanding IO on port P
This assume, of course, that the configurations of the port, such as PortSpeed, # of B2B buffers, etc., are a constant.

The intercept $\beta_0$ and coefficients $\beta_1$-$\beta_5$ are determined from the training dataset captured from the data streamed out of the switches 302. The more general method of maximum likelihood can then also be leveraged by SAN analytics process 248, as it produces better statistical properties. More specifically, this technique estimates values for $\beta_1$-$\beta_n$ such that using these values to derive p(X) yields a number closest to 1 for those cases when all the slow drain counters are increasing and is closest to 0 when none of these counters are impacted.

In some embodiments, SAN analytics process 248 can further refine the above process using linear discriminant analysis, where there can be more than two response classes, such as 'Severe' (e.g., tx_wait is increasing), Moderate (e.g., tx_bbz increasing, but not tx_wait), or 'Low' (e.g., only the tx_bbcredit value is low) and a probability between 0 to 1 can be predicted for each of these response classes.

In a further embodiment, the predictor variables can be further expanded as Read vs. Write (e.g., Read Average IOPS and Write Average IOPS), to see whether additional insights can be obtained with respect to specific I/O patterns (e.g., Reads causing more impact compared to Writes or vice-versa).

An error coefficient ε can also be associated with p(X), to account for dynamic conditions occurring in the network outside the scope of the particular port in question. SAN analytics process 248 may automatically choose a model such that this error coefficient is kept at a minimum.

Further, no two SANs are the same and, hence, the model built by SAN analytics process 248 for one network may not be applicable for another. Every inference/prediction drawn can be applicable only for a specific port only. Even for a port, if significant changes are made to the network, retraining the models may be necessary with new datasets. However, such retraining can also be computationally expensive, especially if the network characteristics change fairly regularly. In such cases, SAN analytics process 248 may instead employ a more generalized model with high variance, to make predictions within an acceptable range of accuracy By training a model per port, the output of such a model could determine the probability of a given F-port starting to show slow drain symptoms based on the specific I/O patterns seen on that part. Since SAN analytics process 248 can predict this with a probability value between 0 and 1, early behavioral warnings can be provided for a port based on a configurable threshold/tolerance value. This prediction can be provided even before the F-port slow drain counter increase is detected. After a training/testing and selecting a model, there is no longer a need for constant correlation of data, since the model can now predict the results based on observed predictor values.

In addition, the I/O metrics with the high probability of slow drain can be "zoomed-in" or "zoomed-out" into more granular or finer views by an example diagram of flow characteristics, to observe patterns for deeper insights. For example, an 'ITL' view can determine the top-n flows (ITLs) that could be contributing to the slow drain situation. Conversely, a 'TL view' can determine the top storage volumes contributing to the slow drain situation. Once this this information is obtained, an administrator can perform application level (e.g., using ITL view, I view) tuning, if any, such as by limiting IOPS of a database application, tuning the QDepth configuration of the OS/HBA, etc. On the target, the administrator can also perform storage level tuning (e.g., using ITL view, TL view) tuning, such as rebalancing LUNs to different ports to distribute load, limiting the IOPS per server from a target port, enabling or disabling storage services, remapping a LUN to a different class of media, etc.

Figure 5:
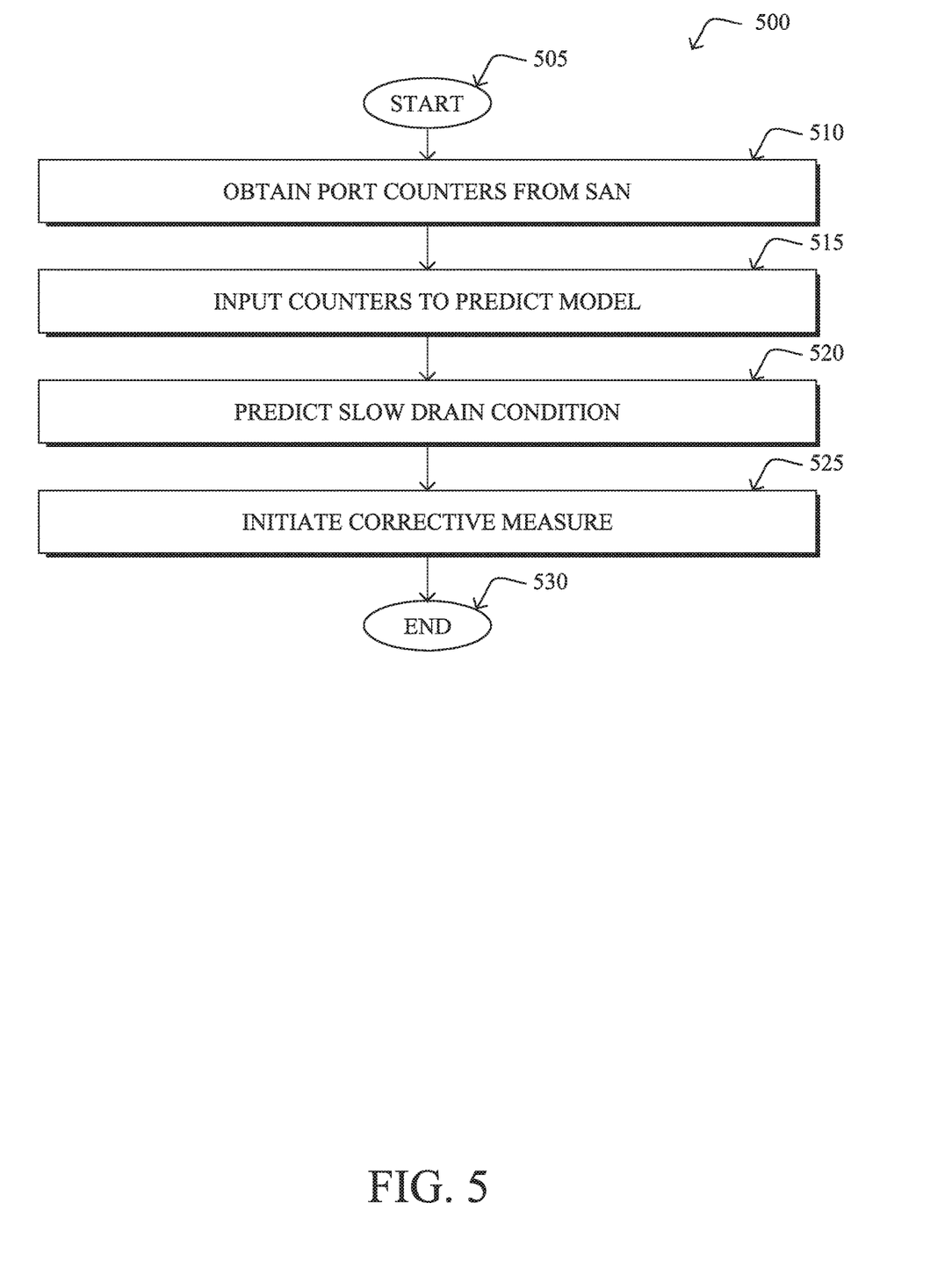
FIG. 5 illustrates an example simplified procedure for detecting and correcting a slow drain condition in a SAN.

FIG. 5 illustrates an example simplified procedure for detecting and correcting a slow drain condition in a SAN, in accordance with one or more embodiments described herein. For example, a non-generic, specifically configured device (e.g., device 200) may perform procedure 500 by executing stored instructions (e.g., process 248). The procedure 500 may start at step 505, and continues to step 510, the device may obtain one or more F-port counters and one or more E-port counters in a SAN. For example, such counters may be indicative of one or more of: a frame drop count, a data rate, a transmit wait count, or a port credit-related counter.

At step 515, as detailed above, the device may input the obtained F-port and E-port counters to a machine learning-based prediction model. In various embodiments, the prediction model may comprise a multiple linear regression model. Such a model may, for example, be trained in part by selecting which F-port counters are most predictive of the one or more E-port counters.

At step 520, the device may use the prediction model to predict a slow drain condition in the SAN, based on the counters input to the model, as described in greater detail above. Indeed, the prediction model may assess the various counters input to the model, to determine whether a slow drain condition exists and, if so, the cause of such a condition. For example, the model may be configured to identify which F-port(s) are responsible for an observed E-port having zero credits, indicating a slow drain condition. Such a condition may be of the classical form or, in further cases, due to oversubscription in the SAN.

At step 525, as detailed above, the device may initiate a corrective measure in the SAN, based on the predicted slow drain condition. For example, the device may initiate a port quarantine, a port reset, or a port ingress rate limiter in the SAN, to address the slow drain condition. This may be performed either automatically or, alternatively, in conjunction with instructions to do so by a network administrator. For example, in some cases, the device may provide data regarding the prediction to a user interface, potentially along with a confidence value associated with the prediction, for review by an administrator. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the detection and analysis of slow drain conditions within a SAN. In some aspects, the techniques may apply a machine learning-based prediction model to E-port and F-port counters from the SAN, to assess the slow drain condition. In further embodiments, the proposed system may also assess flow level data, to further detect and assess the slow drain condition.

While there have been shown and described illustrative embodiments that provide for the detection and assessment of slow drain conditions in a SAN, it is to be understood that various other adaptations and modifications may be made within the spirit and scope of the embodiments herein. For example, while certain embodiments are described herein with respect to using certain models for purposes of predicting the cause of a slow drain condition, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a device, one or more fabric port (F-port) counters and one or more extender port (E-port) counters in a storage area network (SAN);
    inputting, by the device, the obtained F-port and E-port counters to a machine learning-based prediction model;
    using, by the device, the prediction model to predict a slow drain condition in the SAN, based on the counters input to the model; and
    initiating, by the device, a corrective measure in the SAN, based on the predicted slow drain condition.

2. The method as in claim 1, wherein initiating the corrective measure in the SAN comprises at least one of: initiating a port quarantine, a port reset, or a port ingress rate limiter in the SAN.

3. The method as in claim 1, further comprising:
    obtaining, by the device, flow level metrics for an F-port in the SAN; and
    using, by the device, the flow level metrics as input to a classifier, to predict the slow drain condition.

4. The method as in claim 3, wherein the classifier comprises a multiple logistic regression model.

5. The method as in claim 1, further comprising:
    training the prediction model in part by selecting which F-port counters are most predictive of the one or more E-port counters.

6. The method as in claim 1, wherein the prediction model is a multiple linear regression model.

7. The method as in claim 1, wherein the counters are indicative of at least one of: a frame drop count, a data rate, a transmit wait count, or a port credit-related counter.

8. The method as in claim 1, wherein the slow drain condition is attributable to oversubscription.

9. An apparatus, comprising:
    one or more network interfaces to communicate with a network;
    a processor coupled to the network interfaces and configured to execute one or more processes; and
    a memory configured to store a process executable by the processor, the process when executed configured to:
        obtain one or more fabric port (F-port) counters and one or more extender port (E-port) counters in a storage area network (SAN);
        input the obtained F-port and E-port counters to a machine learning-based prediction model;
        use the prediction model to predict a slow drain condition in the SAN, based on the counters input to the model; and
        initiate a corrective measure in the SAN, based on the predicted slow drain condition.

10. The apparatus as in claim 9, wherein the apparatus initiates the corrective measure in the SAN by at least one of: initiating a port quarantine, a port reset, or a port ingress rate limiter in the SAN.

11. The apparatus as in claim 9, wherein the process when executed is further configured to:
    obtain flow level metrics for an F-port in the SAN; and
    use the flow level metrics as input to a classifier, to predict the slow drain condition.

12. The apparatus as in claim 11, wherein the classifier comprises a multiple logistic regression model.

13. The apparatus as in claim 9, wherein the process when executed is further configured to:
    train the prediction model in part by selecting which F-port counters are most predictive of the one or more E-port counters.

14. The apparatus as in claim 9, wherein the prediction model is a multiple linear regression model.

15. The apparatus as in claim 9, wherein the counters are indicative of at least one of: a frame drop count, a data rate, a transmit wait count, or a port credit-related counter.

16. The apparatus as in claim 9, wherein the slow drain condition is attributable to oversubscription.

17. A tangible, non-transitory, computer-readable medium storing program instructions that cause a device to execute a process comprising:
    obtaining, by the device, one or more fabric port (F-port) counters and one or more extender port (E-port) counters in a storage area network (SAN);
    inputting, by the device, the obtained F-port and E-port counters to a machine learning-based prediction model;
    using, by the device, the prediction model to predict a slow drain condition in the SAN, based on the counters input to the model; and
    initiating, by the device, a corrective measure in the SAN, based on the predicted slow drain condition.

18. The computer-readable medium as in claim 17, wherein initiating the corrective measure in the SAN comprises at least one of: initiating a port quarantine, a port reset, or a port ingress rate limiter in the SAN.

19. The computer-readable medium as in claim 17, wherein the counters are indicative of at least one of: a frame drop count, a data rate, a transmit wait count, or a port credit-related counter.

20. The computer-readable medium as in claim 17, wherein the prediction model is a multiple linear regression model.

* * * * *

UNITED STATES PATENT AND TRADEMARK OFFICE
CERTIFICATE OF CORRECTION

PATENT NO. : 10,986,023 B2
APPLICATION NO. : 16/516410
DATED : April 20, 2021
INVENTOR(S) : Harsha Bharadwaj Page 1 of 1

It is certified that error appears in the above-identified patent and that said Letters Patent is hereby corrected as shown below:

In the Specification

Column 2, Line 9, please amend as shown:
network interfaces 210 for storing software programs and Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*